United States Patent
Green et al.

(10) Patent No.: US 12,052,267 B2
(45) Date of Patent: Jul. 30, 2024

(54) SYSTEM AND METHOD FOR DIGITAL IMAGING AND COMMUNICATIONS IN SECURITY STANDARD COMPLIANCE VALIDATION

(71) Applicant: Battelle Memorial Institute, Columbus, OH (US)

(72) Inventors: Brian Green, Medford, NJ (US); Rodney Hallgren, Philadelphia, PA (US)

(73) Assignee: Battelle Memorial Institute, Columbus, OH (US)

( * ) Notice: Subject to any disclaimer, the term of this patent is extended or adjusted under 35 U.S.C. 154(b) by 346 days.

(21) Appl. No.: 17/680,807

(22) Filed: Feb. 25, 2022

(65) Prior Publication Data

US 2022/0286468 A1    Sep. 8, 2022

Related U.S. Application Data

(60) Provisional application No. 63/157,367, filed on Mar. 5, 2021.

(51) Int. Cl.
*H04L 9/40*    (2022.01)
(52) U.S. Cl.
CPC ............ *H04L 63/123* (2013.01); *H04L 63/20* (2013.01)
(58) Field of Classification Search
CPC ............................. H04L 63/123; H04L 63/20
See application file for complete search history.

(56) References Cited

U.S. PATENT DOCUMENTS

8,690,325 B1 * 4/2014 Straus .................. A61B 5/0002
351/200
10,867,695 B2 * 12/2020 Neagle, III .......... A61B 5/0015
(Continued)

*Primary Examiner* — Beemnet W Dada
(74) *Attorney, Agent, or Firm* — Grossman, Tucker, Perreault & Pfleger PLLC; Donald J. Perreault (57) ABSTRACT

A system and method for digital imaging and communications in security (DICOS) standard compliance validation. The system and method may validate both communication messages and files for compliance with the DICOS standard. In some embodiments, the system includes a processor for communicating with a test subject and a memory having program instructions stored thereon for performing a compliance test of the test subject to determine if the test subject is complaint with the DICOS standard. Execution of the instructions by the processor causes the processor to carry out the steps of: confirming that a transmitted DICOS message, e.g., a response or request, from the test subject is compliant with the DICOS standard; logging any errors in the transmitted DICOS message from the test subject in a validation report; and transmitting a simulated DICOS message, e.g., a response or request, to the test subject. In some embodiments, the steps further include, in response to the transmitted DICOS message, accessing a DICOMDIR file stored in the memory. The DICOMDIR file may be configured as a directory for DICOM file sets stored the memory. Transmitting the simulated DICOS message to the test subject may be performed in response to accessing the DICOMDIR file stored in the memory. Also, a DICOM file may be stored or retrieved from memory in response to accessing the DICOMDIR file stored in the memory.

14 Claims, 10 Drawing Sheets

(56) References Cited

U.S. PATENT DOCUMENTS

| | | | |
|---|---|---|---|
| 10,984,895 B2* | 4/2021 | Neagle, III | A61B 5/742 |
| 2013/0167250 A1* | 6/2013 | Balasubramanian | H04L 63/00 |
| | | | 726/28 |
| 2016/0183807 A1* | 6/2016 | Schoenle | A61B 8/12 |
| | | | 600/479 |
| 2017/0316381 A1* | 11/2017 | Dawson, Jr. | G16H 40/20 |
| 2022/0084645 A1* | 3/2022 | Ginsburg | G16H 10/60 |

* cited by examiner

SYSTEM AND METHOD FOR DIGITAL IMAGING AND COMMUNICATIONS IN SECURITY STANDARD COMPLIANCE VALIDATION

CROSS-REFERENCE TO RELATED APPLICATIONS

The present application claims the benefit of U.S. Provisional Application Ser. No. 63/157,367, filed Mar. 5, 2021, the teachings of which are hereby incorporated herein by reference.

TECHNICAL FIELD

The present application relates generally to a system and method for digital imaging and communications in security (DICOS) standard compliance validation.

BACKGROUND

The digital imaging and communications in security (DICOS) standard is a known data communication and format-neutral standard used for security equipment, e.g., baggage screeners, x-ray equipment, etc. DICOS facilitates data information interchange related to objects of inspection between different types of security equipment and/or security equipment from different manufacturers. The data information may be, for example, demographic information, x-ray radiographs, CT images, material specific information, trace detection signatures, threat assessment, etc. The objects of inspection may be, for example, checked luggage, carry-on luggage, parcels, personnel, etc.

DICOS allows the information to be transmitted on a common network, stored in a DICOS-compliant storage medium, and viewed on any DICOS-compliant workstation or other DICOS-compliant device. Using the DICOS standard, equipment manufacturers and suppliers can innovate with security products with greater flexibility and speed, and security operators can likewise achieve greater freedom to innovate with their security countermeasures. The DICOS standard is published by, and is available from, the National Electrical Manufacturers Association (NEMA) of Arlington, Virginia, USA and is currently in version v02A-2021. The DICOS standard is an addendum to the known Digital Imaging and Communications in Medicine (DICOM) standard, which specifies a data interchange protocol, digital image format, and file structure for biomedical images and image-related information. The DICOM standard is also published by NEMA.

One challenge in using the DICOS standard lies in ensuring that manufacturers and suppliers accurately configure security equipment and electronic files in compliance with the standard. If equipment or an electronic file inadvertently fails to comply with the DICOS standard, it will not be able to fully and/or properly communicate information with DICOS configured equipment, thus defeating the value and intent of the DICOS standard. In some cases, lack of compliance with the DICOS standard may be identified only after equipment is purchased and installed, or only when the equipment is performing certain communication functions. This can lead to risks associated with failure of security and significant cost in replacing the equipment or bringing the equipment into compliance with the standard.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

In some embodiments, a system and method for digital imaging and communications in security (DICOS) standard compliance validation consistent with the present disclosure includes a processor for communicating with a test subject and a memory having program instructions stored thereon for performing a compliance test of the test subject to determine if the test subject is complaint with the DICOS standard. Execution of the instructions by the processor causes the processor to carry out the steps of: confirming that a transmitted DICOS message, e.g., a response or request, from the test subject is compliant with the DICOS standard; logging any errors in the transmitted DICOS message from the test subject in a validation report; and transmitting a simulated DICOS message, e.g., a response or request, to the test subject. In some embodiments, the steps further include, in response to the transmitted DICOS message, accessing a DICOMDIR file stored in the memory. The DICOMDIR file may be configured as a directory for DICOM file sets stored the memory. Transmitting the simulated DICOS message to the test subject may be performed in response to accessing the DICOMDIR file stored in the memory. Also, a DICOM file may be stored or retrieved from memory in response to accessing the DICOMDIR file stored in the memory.

Figure 1:
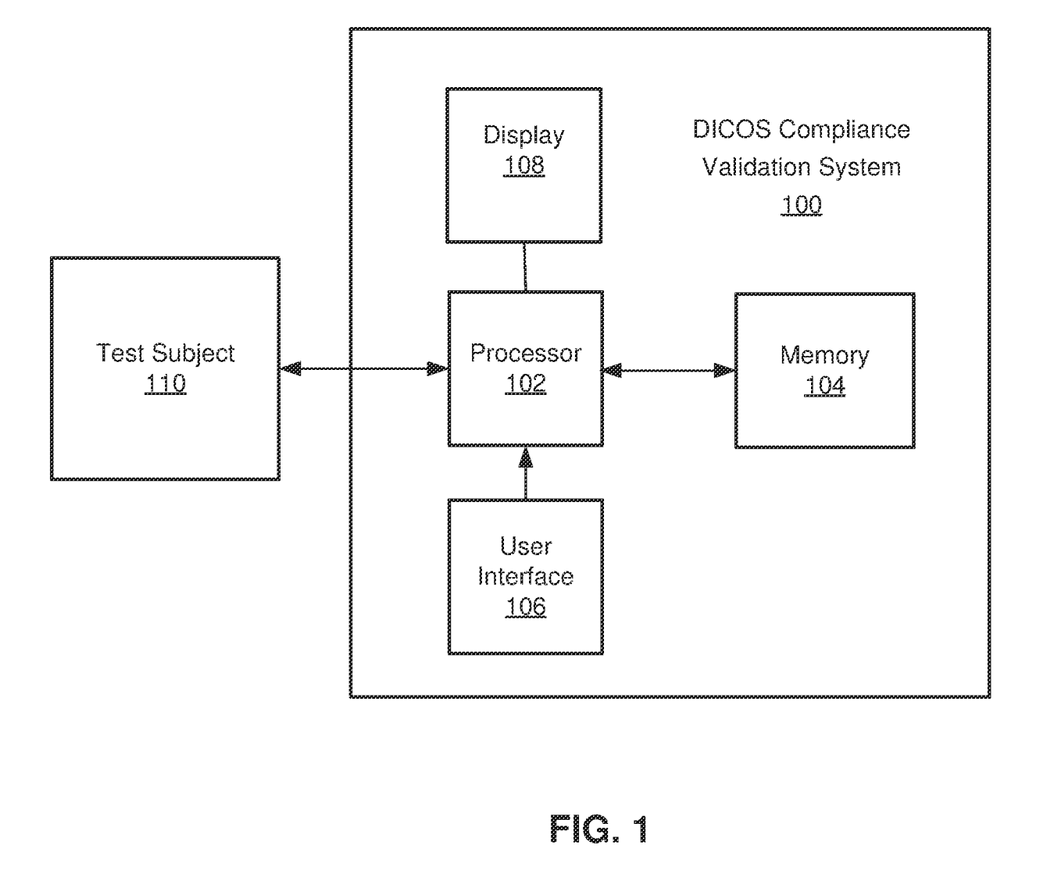
FIG. 1 is a simplified block diagram of one example of a system consistent with the present disclosure.

Systems and methods consistent with the present disclosure may be implemented in a variety of configurations. FIG. 1, for example, is a simplified block diagram of one example embodiment of a DICOS compliance validation system 100 consistent with the present disclosure. The illustrated system 100 includes one or more processors 102, memory 104, a user interface 106 and display 108. The system 100 is illustrated as being coupled to a test subject 110, which may be any security equipment, e.g., a baggage screener, x-ray equipment, etc., or a DICOS encoded file to be validated for DICOS compliance. In general, the system simulates operation of equipment to which the subject 110 would be connected in a security system and/or tests the format of a DICOS encoded file to confirm that the subject 110 is configured in compliance with the DICOS standard.

The processor 102 may be any known general-purpose computer or processor capable of executing software instructions. The processor 102 may be configured as a single dedicated processor, a single shared processor, or by a plurality of individual processors, some of which may be shared. The term processor as used herein should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The memory 104 is operatively coupled to the processor and may be any tangible, non-transitory computer readable medium having instructions stored thereon that when executed by the processor 104 perform the DICOS compliance validation for the subject 110 consistent with the present disclosure. Thus, for example, the memory 104 may store instructions (in, for example, firmware or software) to perform the operations described herein. The memory 104, may include any type of tangible medium, for example, any type of disk optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

In general, the processor 102 may execute software instructions stored in the memory 104 to perform a compliance test of the subject 110. In the compliance test the system 100 simulates the inputs/outputs (i/o) the subject 110 would send/receive in the security system and/or tests the format of a DICOS encoded file to confirm the subject 110 is in compliance with the DICOS standard and logs the results of the compliance test. The user interface is operatively coupled to the processor and may be any known user interface, such as a keyboard or touch screen, that allows a user to initiate or terminate a compliance test of a subject 110, provide parameters for operation of a compliance test, manage the results of the compliance test, store data or software in memory, etc. The display is operatively coupled to the processor may be any known display device, e.g., a computer screen, printer, etc. that allows a user to view information related to the compliance test, e.g., a user interface for the system, compliance test status, information about the subject 110, the compliance test results, etc.

Figure 2:
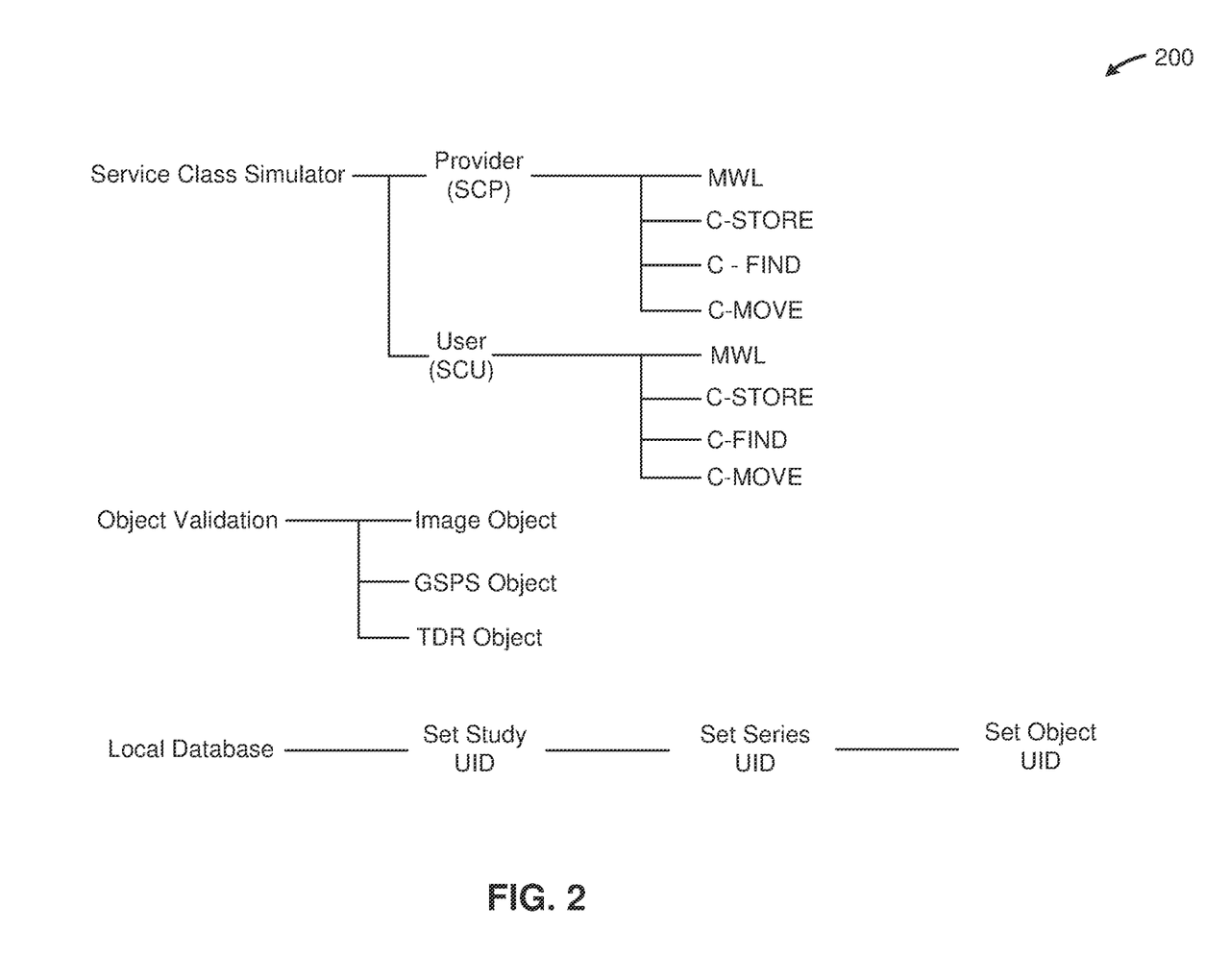
FIG. 2 diagrammatically illustrates three components of one example embodiment a compliance test consistent with the present disclosure.

FIG. 2 diagrammatically illustrates three main components of one example embodiment of a compliance test consistent with the present disclosure. It is to be understood, however, that a compliance test consistent with the present disclosure may include any one or more of the illustrated components and/or different components. In the illustrated embodiment, the test includes a service class simulator component, an object validation component, and a local database component.

The service class simulator component performs the various communication compliance tests for service class providers (SCP) and service class users (SCU). A SCP is any security system equipment that is providing a service, e.g., archiving information, and a SCU is any security system equipment that uses a SCP. For example, in the case where the SCP is an archive for archiving information, an SCU of the archive SUP may be an imaging system configured to store images in the archive. As shown in FIG. 2, for example, the service class simulator SCP tests may perform tests of an SCPs MWL (modality work list), C-store (services to store), C-find (services to find) and C-move (services to move) functionality for compliance with the DICOS standard. The service class simulator SCU tests may perform tests of an SCUs MWL (modality work list), C-store (services to store), C-find (services to find) and C-move (services to move) functionality for compliance with the DICOS standard.

The object validation component is configured to perform the various tests for determining whether a DICOS encoded file is in compliance with the DICOS standard. As shown, for example, the object validation component may be configured to test whether an image file, a GSPS object, such as a bounding box generated around an object interest (e.g., a potential weapon), and/or a thread detection report (TDR), such as the results of an advanced imaging technology (AIT) scan, is in compliance with the DICOS standard.

The local database component provides a tool to manage a DICOMDIR file. The DICOMDIR file may be created and/or modified in a system consistent with the present disclosure and used to simulate an SCU/SCP's persistence model. The DICOMDIR is a light-weight database flat file, defined by the DICOM standard. A user of a system and method consistent with the present disclosure could build and manipulate these DICOMDIRs as needed and independent of the system 100. For example, if there is a set of International Air Transport Association (IATA) passenger name records (PNRs) for boarding pass identifiers that are known to be presented in response to a machine query, the DICOMDIR could be prebuilt to serve as the SCPs data structure to construct the C-Find responses. In another example, if there was a need to store a set of test objects when testing an SCP, an open-source utility could be used to package DICOM files and build a DICOMDIR that are readable/usable for the DICOS test.

Unlike a typical flat file, a DICOM standard DICOMDIR is a binary file and is difficult to manage in a text editor. The local database component provides a tool for manually changing a DICOMDIR file and/or querying the DICOMDIR file in a facile manner. In some embodiments, the local database component may allow a user to search the DICOMDIR to get file unique identifiers (UIDs) as defined by the Internet Assigned Numbers Authority (IANA), e.g., study UIDs, series UIDs, and/or object UIDs, so they could be passed to other functions. For example, when testing an SCP, it may be necessary to send images. In that case, a user may first use the local database component to find the DICOM UIDs (which are global unique identifiers in the DICOM files), then save those in memory to use when running a command to send the images.

Figure 3:
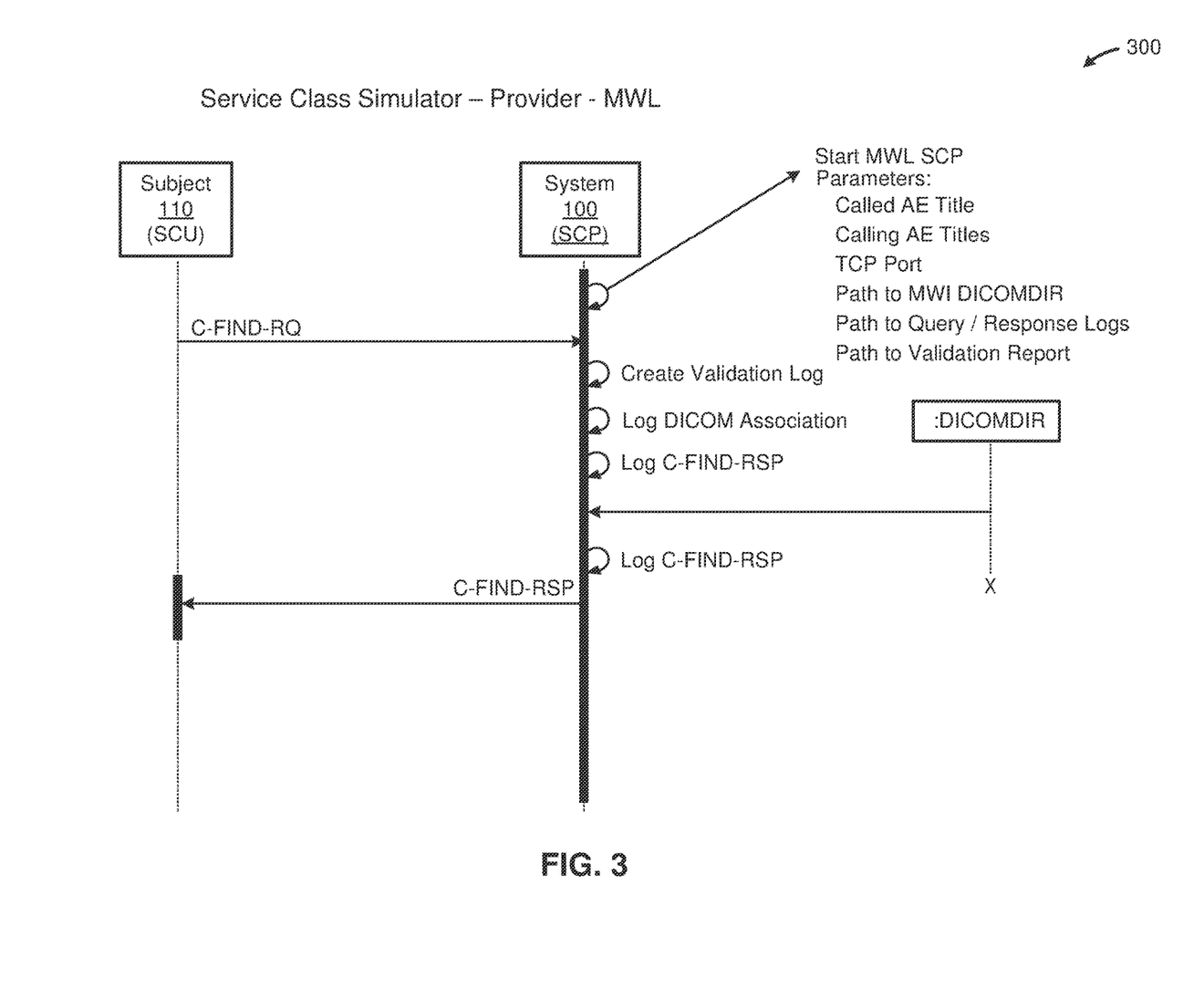
FIG. 3 is a process flow diagram illustrating the process flow for one example of a service class provider (SCP) compliance test for a modality worklist (MWL) consistent with the present disclosure.

Turning now to FIG. 3, there is illustrated the process flow for one example of a service class simulator SCP compliance test for an MWL. It is to be understood that the example process flows illustrated herein are provided by way of example, not of limitation. Those of ordinary skill in the art will recognize that process flows may be configured in a variety of ways in a manner consistent with the present disclosure, and the steps in the process need not necessarily be performed in the illustrated order. Also, in some embodiments one or more of the illustrated steps may be omitted.

In the example illustrated example, the subject 110 is an SCU (user) and the DICOS compliance validation system 100 is configured to simulate an SCP (Provider) and its associated DICOMDIR file. Those of ordinary skill in the art will recognize that a DICOMDIR file acts as a directory for DICOM file sets stored in memory 104.

Before performing any compliance tests, certain test configuration options may be established for the test, e.g., using a user interface 106 and entering or downloading configuration information to a configuration file stored in memory 104 for use by the processor 102 during the compliance test. For an SCP, for example, the following configuration options may be established: for called application entity (AE) titles the internet protocol (IP) address, the hostname, fully quantified domain name (FQDN), the transmission protocol (TCP), the transport layer security (TLS) certificate path, the TLS port, the DICOM authentication User and the DICOM authentication password; for calling AE titles, the IP address, Hostname, FQDN, TLS certificate path, TLS port, the DICOM authentication User and the DICOM authentication password; the TCP port; the TLS port; the TLS certificate path; the path to the MWL DICOMDIR; the path to DICOM files; the path to validation logs; the path to validation reports; for abstract syntaxes the abstract syntax UID, the abstract syntax name, the abstract syntax acceptance; for transfer syntaxes, the transfer syntax UID, the transfer syntax name, the transfer syntax acceptance; for DICOM MWL dictionary and the C-find dictionary the tag, the tag name, the tag value representation (VR) (VR may equal the attribute content sequence (SQ) for nested tags); and whether the implicit little endian validation mode is selected (yes/no).

Also, as is known, the modality worklist (MWL) is used to provide salient data to be used in the DICOM header to client devices and is what allows a device to use DICOS to query for an object being scanned. Typically, the client devices provide a DICOM tag with a parameter in the C-FIND-RQ and receive a response containing rows which match the parameter. For example, a medical modality would provide a query to a worklist provider (typically an information system supporting the clinical workflow) requesting all studies for the current date and location of the modality. The provider then responds with a list, and the user selects the correct entry. The purpose of modality worklist is to ensure the modality has correct, meaningful and complete metadata (e.g., passenger information, baggage information associated with the passenger, etc.), which would difficult, time consuming, and prone to error for users to transcribe.

In DICOS workflows, scanning devices may need to request information from ancillary systems to provide the correct metadata on the DICOS header. For example, a baggage computed tomography (CT) scanner may request the correct metadata from the conveyance system for the object being scanned, or an AIT device could request information obtained by automated screening systems and ensure the passengers canyon luggage screening is in context with the AIT imaging. In order to perform these queries, the C-FIND-RQ may contain a list of DICOS tags for which it expects to have in the response, with those tags containing query parameters populated.

In a system and method consistent with the present disclosure, the DICOMDIR file is a flat file that encodes the DICOM tags for responses to requests and acts as the MWL source file. When processing a query request from a subject 110, a system 100 performing an SCP compliance test consistent with the present disclosure may search the DICOMDIR for the appropriate tag for response and issue a corresponding response stored in the DICOMDIR. In some embodiments, the system 100 is configured to allow users to create entries in the DICOMDIR. This may be accomplished by using either file downloadable to memory 104, a series of CSV files, XML/JSON files, etc. All DICOM association details, including the C-FIND-RQ, the response sent back and any idiosyncrasies in the DICOM communications may be logged by the system for determining compliance with the DICOS standard.

With reference again to FIG. 3, the illustrated example process flow begins when the SCP compliance test is initiated and reads the test parameters set in its configuration file (e.g., the DICOMDIR path, the TCP port, the path to validation report, etc., as described above). The subject 110 (SCU) calls the system 100 (SCP) with an association request (C-FIND-RQ) and provides its Calling AE title, as well as a Called AE title. A validation log is created and the DICOM association and the C-FIND-RQ are logged and passed through a validation test with exceptions noted in a validation report. The accepted Calling AE titles may be checked and if the AE does not exist a validation exception may be noted but the association may be accepted to continue the compliance test. The Called AEs may also be validated against a list of known calling AE titles in the configuration file. Exceptions may be noted in the validation report, but if an exception is noted the associated may be accepted to continue the compliance test. The Calling AEs TCP parameters may also be validated, and exceptions may be noted in the validation report.

Next, the C-FIND-RQ may be processed against the DICOMDIR and matching rows are returned to the equipment (C-FIND-RSP). All details, including the request (C-FIND-RQ) and the response (C-FIND-RSP) may be logged to the validation report.

Figure 4:
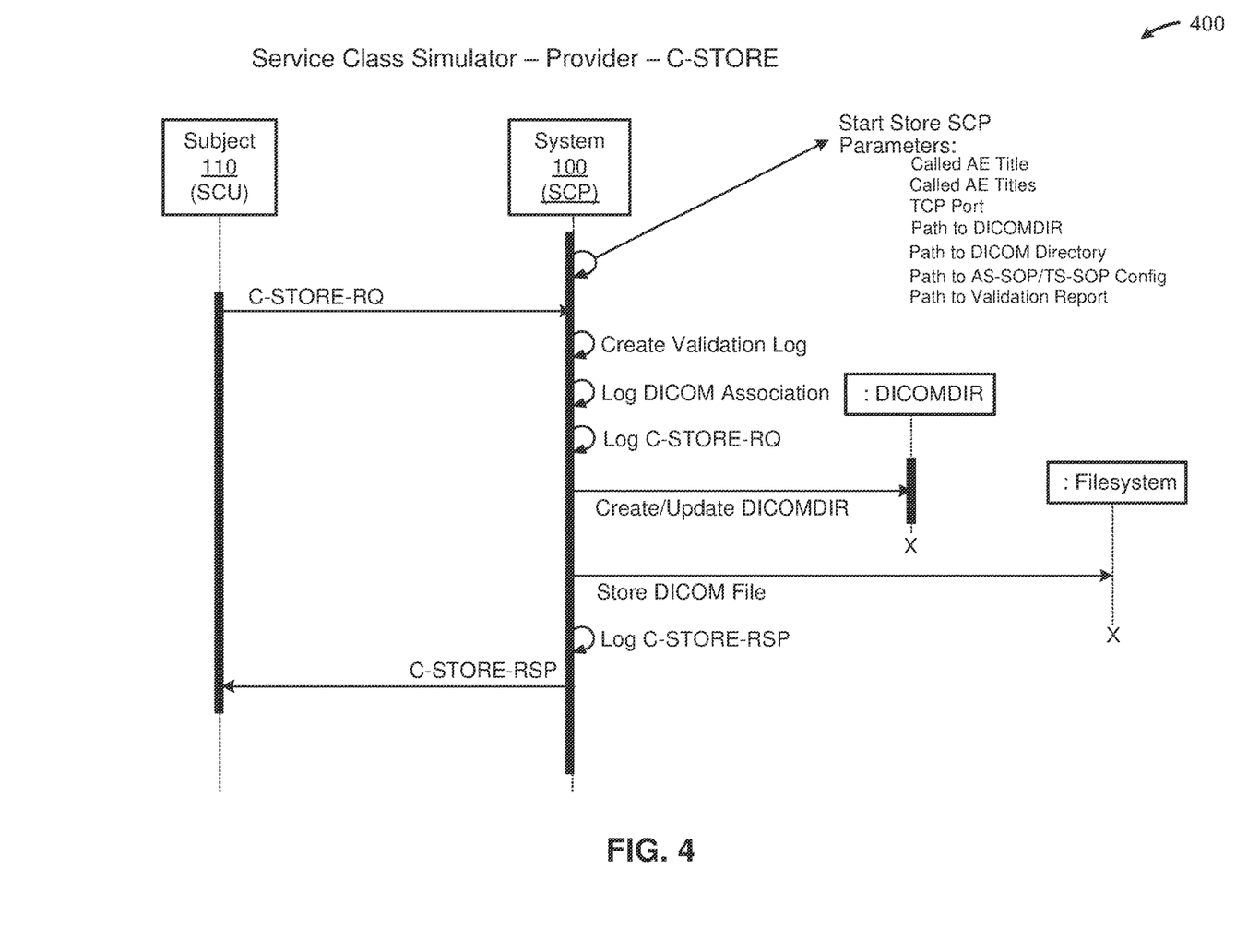
FIG. 4 is a process flow diagram illustrating the process flow for one example of a service class provider (SCP) compliance test for C-Store functionality consistent with the present disclosure.

FIG. 4 illustrates an example process flow for service class simulator SCP compliance tests for the services to store (C-Store). The C-Store operation is used in DICOM to send a DICOM file to another DICOM device. The illustrated example process flow begins when the SCP compliance test is initiated and reads the test parameters set in its configuration file (e.g., the DICOMDIR path, the TCP port, the path to validation report, etc., as described above). The subject 110 (SCU) calls the system 100 (SCP) with an association request (C-STORE-RQ) and provides its Calling AE title, as well as a Called AE title. A validation log is created and the DICOM association and the C-STORE-RQ are logged and passed through a validation test with exceptions noted in a validation report. The accepted calling AE titles may be checked and if the AE does not exist a validation exception may be noted but the association may be accepted to continue the compliance test. The Called AEs may also be validated against a list of known calling AE titles in the configuration file. Exceptions may be noted in the validation report, but if an exception is noted the associated may be accepted to continue the compliance test. The Calling AEs TCP parameters may also be validated, and exceptions may be noted in the validation report.

The proposed transfer syntaxes in the C-STORE-RQ may also be evaluated against the transfer syntaxes in the configuration file. If the proposed syntax exists in the accepted list, the validation passes. If the proposed syntax is not in the accepted list, a validation exception is noted but the association may be accepted to continue the compliance test. If the test is in ILI validation mode, all transfer syntaxes may be rejected. During processing of the received objects the objects may be verified as having a transfer syntax of implicit little endian.

Validation/compliance tests are then run against each of the objects received with the C-STORE-RQ and the results are stored in the validation report. The DICOM DIR file is updated with information on the objects and the objects are stored in memory at the DICOM path in the configuration file.

Figure 5:
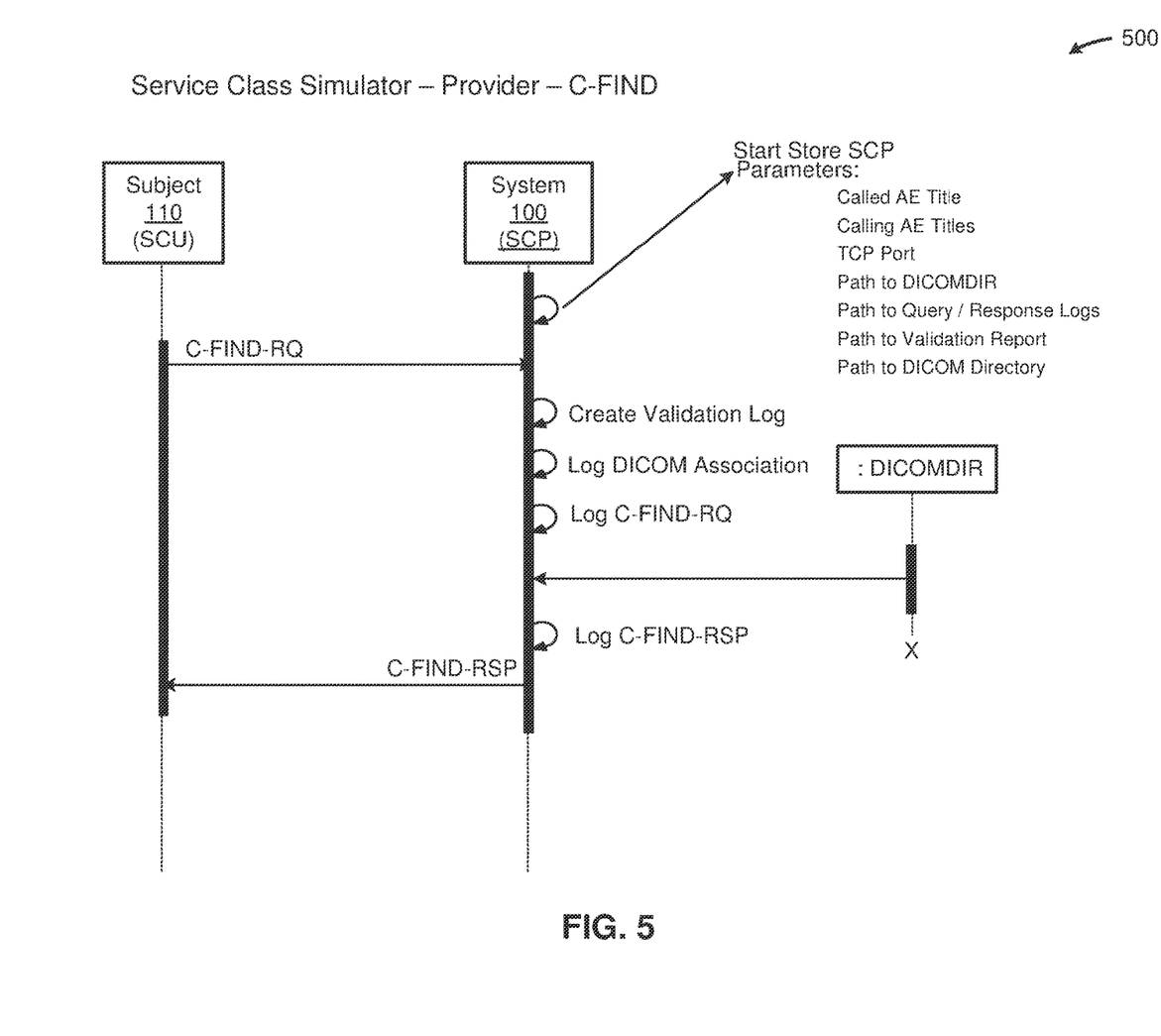
FIG. 5 is a process flow diagram illustrating the process flow for one example of a service class provider (SCP) compliance test for C-Find functionality consistent with the present disclosure.

FIG. 5 illustrates an example process flow for service class simulator SCP compliance tests for the services to find (C-Find). The C-Find operation is used in DICOS to query DICOS contents under management in another DICOS device. For example, the C-Find operation may be used to request all x-rays/CT scans for a particular bag number. This test is similar to the SCP MWL compliance test, but it is designed for SCUs to interrogate SCPs (simulated by the system 100) for objects that are available. This functionality is typically used by workstations, ancillary systems, and algorithms to find images and acquire their unique identifiers.

The illustrated example process flow begins when the SCP compliance test is initiated and reads the test parameters set in its configuration file (e.g., the DICOMDIR path, the TCP port, the path to validation report, etc., as described above). The subject 110 (SCU) calls the system 100 (SCP) with an association request (C-FIND-RQ) and provides its Calling AE title, as well as a Called AE title. A validation log is created and the DICOM association and the C-FIND-RQ are logged and passed through a validation test, with exceptions noted in a validation report. The accepted Calling AE titles may be checked and if the AE does not exist a validation exception may be noted but the association may be accepted to continue the compliance test. The Called AEs may also be validated against a list of known calling AE titles in the configuration file. Exceptions may be noted in the validation report, but if an exception is noted the associated may be accepted to continue the compliance test. The Calling AEs TCP parameters may also be validated, and exceptions may be noted in the validation report.

Next, the C-FIND-RQ may be processed against the DICOMDIR, and matching rows are returned to the equipment (C-FIND-RSP). All details, including the request (C-FIND-RQ) and the response (C-FIND-RSP) may be logged to the validation report.

Figure 6:
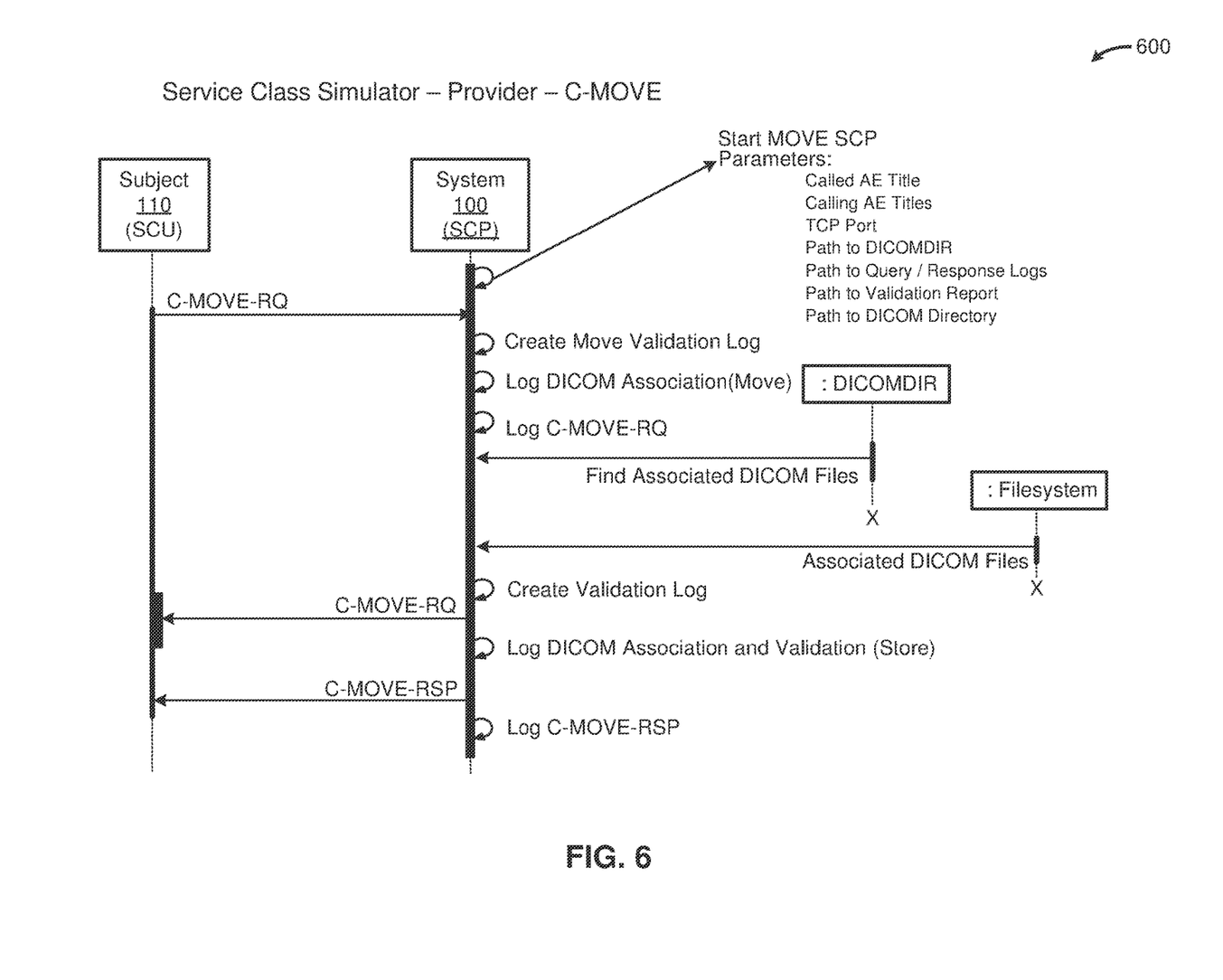
FIG. 6 is a process flow diagram illustrating the process flow for one example of a service class provider (SCP) compliance test for C-Move functionality consistent with the present disclosure.

FIG. 6 illustrates an example process flow for service class simulator SCP compliance tests for the services to move (C-Move). The C-Move operation is used in DICOS to instruct another DICOS device to send a specific object to another device. In particulate, the C-Move command is used to instruct an SCP to initiate a C-STORE to known node/device. A move request contains the AE Title of the node to which the objects should sent, and the object UIDs. Each association may contain either a Study (Scan), Series or Instance level UID (there is a parameter in the association to define the level at which the MOVE is being requested). This functionality is frequently used following C-FIND command to request the transmission of studies.

The illustrated example process flow begins when the SCP compliance test is initiated and reads the test parameters set in its configuration file (e.g., the DICOMDIR path, the TCP port, the path to validation report, etc., as described above). A subject 110 (SCU) calls the system 100 (SCP) with an association request (C-MOVE-RQ) and provides parameters including its Calling AE title, as well as a Called AE title. A validation log is created and the DICOM association and the C-FIND-RQ are logged and passed through a validation test, with exceptions noted in a validation report. The accepted Calling AE titles may be checked and if the AE does not exist a validation exception may be noted but the association may be accepted to continue the compliance test. The Called AEs may also be validated against a list of known calling AE titles in the configuration file. Exceptions may be noted in the validation report, but if an exception is noted the associated may be accepted to continue the compliance test. The Calling AEs TCP parameters may also be validated, and exceptions may be noted in the validation report.

Next, the C-FIND-RQ may be processed against the DICOMDIR, and matching rows are returned to the equipment (C-FIND-RSP). All details, including the request (C-FIND-RQ) and the response (C-FIND-RSP) may be logged to the validation report. The DICOMDIR is queried and provides the information on the location of the associated DICOM files at the DICOM path in the configuration file. The DICOM files are then provided. A C-Store request (C-STORE-RQ) and a C-Move response (C-MOVE-RSP) are provided and validated. All DICOM association and validation results are stored in a validation log.

FIGS. 7-11 illustrate example process flows for service class simulator SCU compliance tests for the MWL, C-store, C-find and C-move functionality for compliance with the DICOS standard. In the illustrated examples, the subject 110 is an SCP and the DICOS compliance validation system 100 is configured to simulate the SCU and its associated DICOMDIR file. In general, the system 100 simulates the illustrated function and receives an associated response from the subject 110. The compliance tests and validation operate similarly to the tests described in connection with the SCP tests including validation and logging of associated responses from the subject 110 to confirm compliance of the responses with the DICOS standard.

Figure 7:
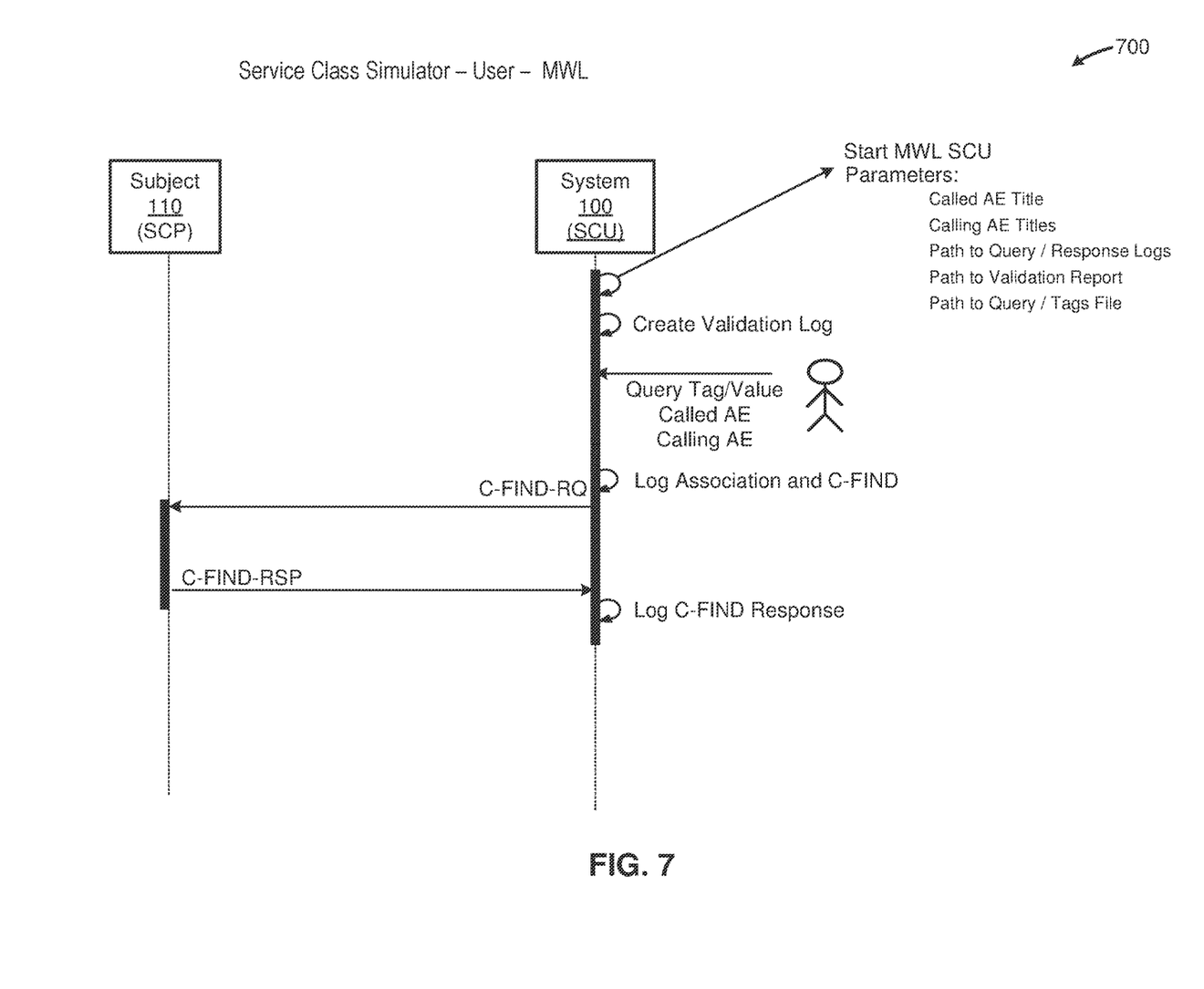
FIG. 7 is a process flow diagram illustrating the process flow for one example of a service class user (SCU) compliance test for an MWL consistent with the present disclosure.

FIG. 7 illustrates the process flow for one example of a service class simulator SCU compliance test for an MWL. As with the SCP compliance tests, before performing an SCU compliance test in a system 100 consistent with the present disclosure certain configuration options may be established for the test, e.g., using a user interface 106 and entering or downloading configuration information to a configuration file stored in memory 104 for use by the processor 102 during the compliance test. For example, the following SCU configuration options may be established: for called application entity (AE) titles the internet protocol (IP) address, the hostname, fully quantified domain name (FQDN), the transmission protocol (TCP), the transport layer security (TLS) certificate path, the TLS port, the DICOM authentication User and the DICOM authentication password; for calling AE titles, the IP address, Hostname, FQDN, TLS certificate path, TLS port, the DICOM authentication User and the DICOM authentication password; the TCP port; the TLS port; the TLS certificate path; the path to the MWL DICOMDIR; the path to DICOM files; the path to validation logs; the path to validation reports; for abstract syntaxes the abstract syntax UID, the abstract syntax name, the abstract syntax acceptance; for transfer syntaxes, the transfer syntax UID, the transfer syntax name, the transfer syntax acceptance; for DICOM MWL dictionary and the C-FIND dictionary, the tag, the tag name, the tag value representation (VR) (VR may equal the attribute content sequence (SQ) for nested tags); and whether the implicit little endian validation mode is selected (yes/no).

The illustrated example process flow begins when the SCU compliance test is initiated and reads the test parameters set in its configuration file (e.g., parameters for the called AE titles, the calling AE titles, the path to query/response logs, the path to validation reports, the path to query/tags files, etc). The system 100 creates a validation log, generates a query with a Called AE and Calling AE title, and logs the DICOM association and C-Find request. The system 100 (SCU) then calls the subject 110 (SCP) with an association request (C-FIND-RQ) and provides its Calling AE title, as well as a Called AE title. The subject 110 responds with a (C-FIND-RSP), which is logged and validated. Any errors in the C-FIND-RSP are stored in the validation log. All details, including the request (C-FIND-RQ) and the response (C-FIND-RSP) may be logged to the validation report.

Figure 8:
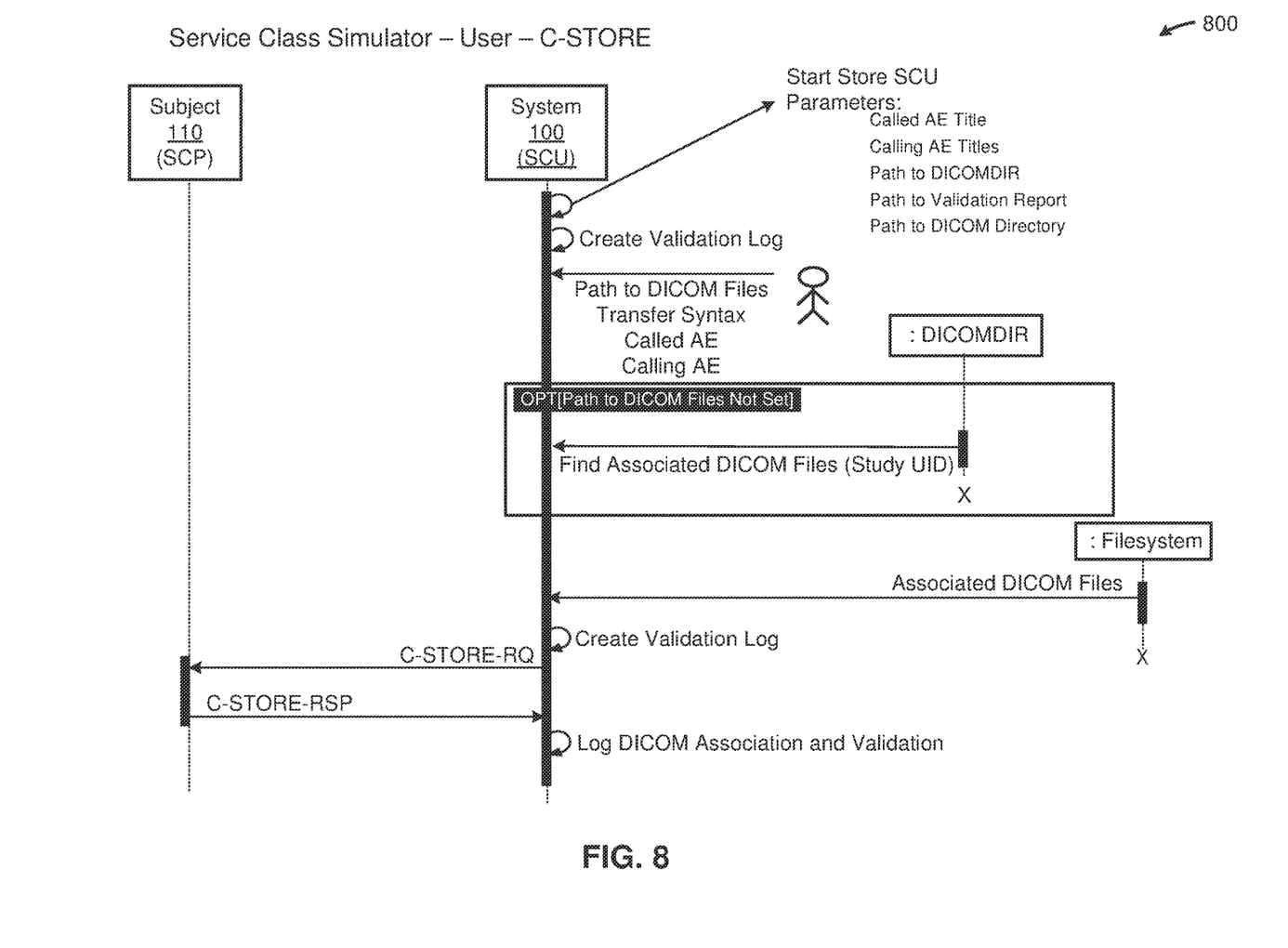
FIG. 8 is a process flow diagram illustrating the process flow for one example of a service class user (SCU) compliance test for C-Store functionality consistent with the present disclosure.

FIG. 8 illustrates an example process flow for service class simulator SCU compliance tests for the services to store (C-Store). The illustrated example process flow begins when the SCU compliance test is initiated and reads the test parameters set in its configuration file (e.g., the Called and Calling AE titles, the DICOMDIR path, the path to validation report, the path to the DICOM directory, etc., as described above). The system 100 creates a validation log and retrieves the path to the DICOM files, transfer syntax and the Called and Calling AEs. The system 100 then accesses the DICOMDIR to find associated DICOM files, e.g., a Study UID, and then retrieves the associated DICOM files from a file system. The retrieved information is logged in a validation log.

The system 100 (SCU) then calls the subject 110 (SCP) with an association request (C-STORE-RQ) and provides its Calling AE title, as well as a Called AE title. The subject responds with a C-STORE-RESP. The C-STORE-RESP from the subject 110 is checked for compliance by the system 100 and any errors are logged in the validation log and noted in a validation report.

Figure 9:
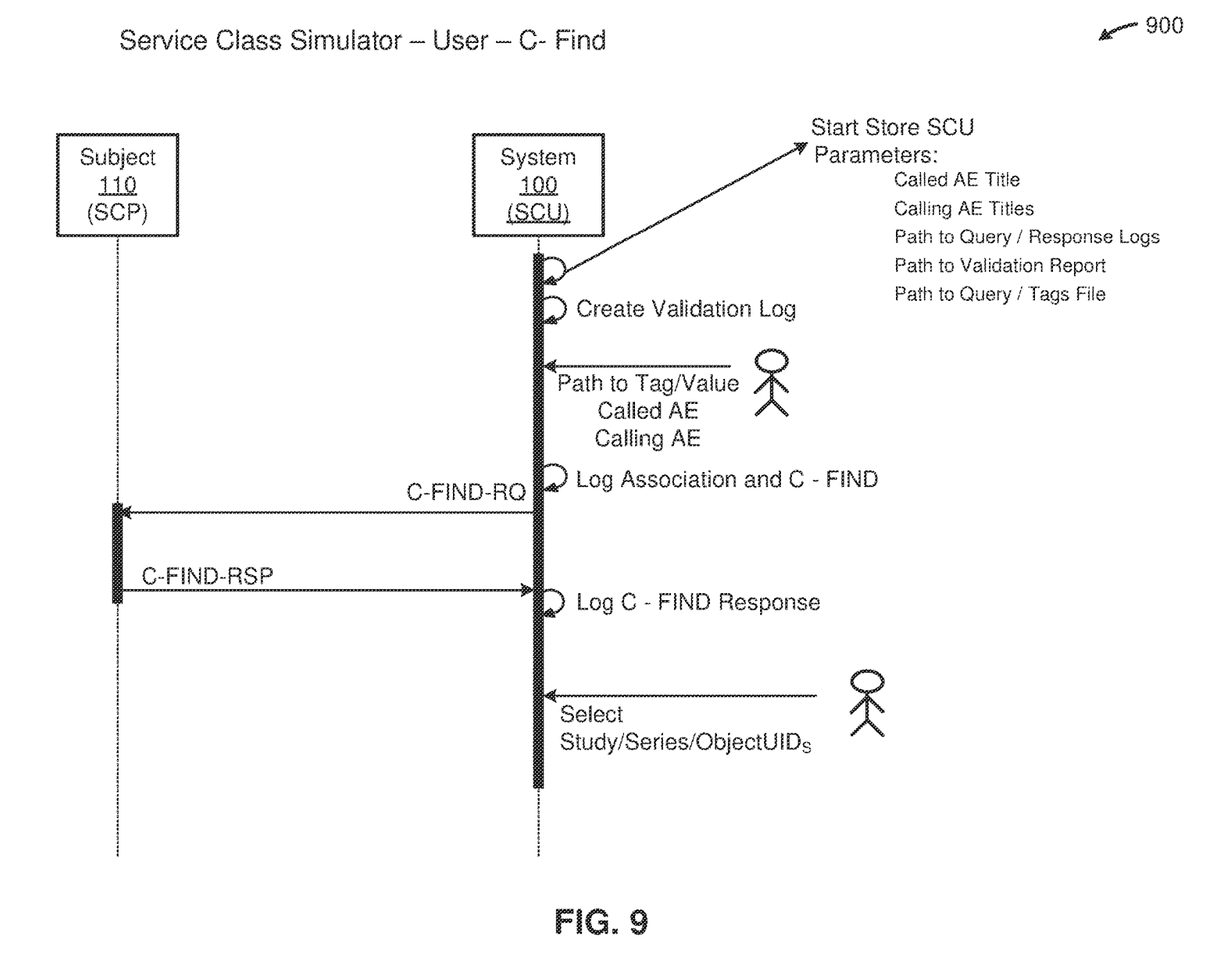
FIG. 9 is a process flow diagram illustrating the process flow for one example of a service class user (SCU) compliance test for C-Find functionality consistent with the present disclosure.

FIG. 9 illustrates an example process flow for service class simulator SCU compliance tests for the services to find (C-Find). The illustrated example process flow begins when the SCU compliance test is initiated and reads the test parameters set in its configuration file (e.g., parameters for the called AE titles, the calling AE titles, the path to query/response logs, the path to validation reports, the path to query/tags files, etc). The system 100 creates a validation log, generates a query with a Called AE and Calling AE title, and logs the DICOM association and C-Find request. The system 100 (SCU) then calls the subject 110 (SCP) with an association request (C-FIND-RQ) and provides its Calling AE title, as well as a Called AE title. The subject 110 responds with a (C-FIND-RSP), which is logged and validated. Any errors in the C-FIND-RSP are stored in the validation log. All details, including the request (C-FIND-RQ) and the response (C-FIND-RSP) may be logged to the validation report. The system 100 may then select study, series and object UIDs and any errors may be logged in the validation log and noted in a validation report.

Figure 10:
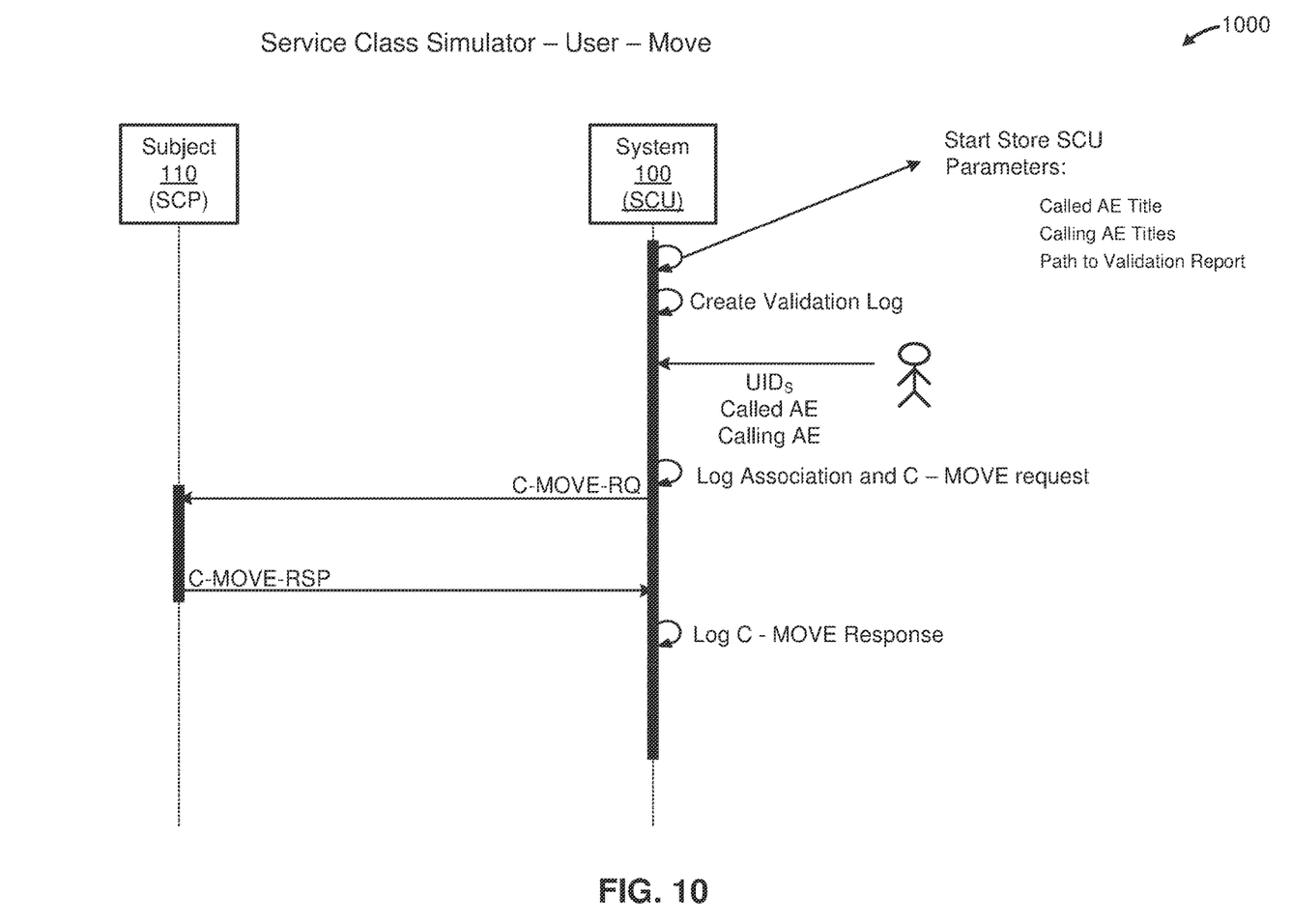
FIG. 10 is a process flow diagram illustrating the process flow for one example of a service class user (SCU) compliance test for C-Move functionality consistent with the present disclosure.

FIG. 10 illustrates an example process flow for service class simulator SCU compliance tests for the services to move (C-Move). The illustrated example process flow begins when the SCU compliance test is initiated and reads the test parameters set in its configuration file (e.g., parameters for the called AE titles, the calling AE titles, the path to query/response logs, the path to validation reports, the path to query/tags files, etc). The system 100 creates a validation log, generates a query with UIDs, Called AE and Calling AE title, and logs the DICOM association and C-MOVE request. The system 100 (SCU) then calls the subject 110 (SCP) with an association request (C-MOVE-RQ), providing UIDs and the Calling AE and Called AE titles. The subject 110 responds with a (C-MOVE-RSP), which is logged and validated. Any errors in the C-MOVE-RSP are stored in the validation log. All details, including the request (C-MOVE-RQ) and the response (C-MOVE-RSP) may be logged to the validation report.

According to one aspect of the disclosure there is thus provided a digital imaging and communications in security (DICOS) compliance validation system including: a processor for communicating with a test subject; a memory having program instructions stored thereon for performing a compliance test of the test subject to determine if the test subject is complaint with the DICOS standard, wherein execution of the instructions by the processor causes the processor to carry out the steps of: confirming that a transmitted DICOS message from the test subject is compliant with the DICOS standard; logging any errors in the transmitted DICOS message from the test subject in a validation report; and transmitting a simulated DICOS message to the test subject.

According to another aspect of the disclosure there is provided a method of testing a test subject for compliance with the digital imaging and communications in security (DICOS) standard, the method including: confirming via a processor that a transmitted DICOS message from the test subject is compliant with the DICOS standard; logging any errors in the transmitted DICOS message from the test subject in a validation report stored in a memory coupled to the processor; and transmitting via the processor a simulated DICOS message to the test subject.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as a controller or processor, may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term controller or processor should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. A digital imaging and communications in security (DICOS) compliance validation system comprising:
   a processor for communicating with a test subject;
   a memory having program instructions stored thereon for performing a compliance test of the test subject to determine if the test subject is complaint with a DICOS standard, wherein execution of the instructions by the processor causes the processor to carry out the steps of:
   confirming that a transmitted DICOS message from the test subject is compliant with the DICOS standard;
   logging any errors in the transmitted DICOS message from the test subject in a validation report; and
   transmitting a simulated DICOS message to the test subject.

2. The system according to claim 1, wherein the transmitted DICOS message is a request or a response from the test subject.

3. The system according to claim 1, wherein the simulated DICOS message is a request or response from the system.

4. The system according to claim 1 further comprising, in response to the transmitted DICOS message, accessing a DICOMDIR file stored in the memory, the DICOMDIR file being configured as a directory for DICOM file sets stored the memory.

5. The system according to claim 4 wherein the transmitting a simulated DICOS message to the test subject is performed in response to accessing the DICOMDIR file stored in the memory.

6. The system according to claim 4 further comprising storing a DICOM file in the memory in response to the accessing the DICOMDIR file stored in the memory.

7. The system according to claim 4 further comprising retrieving a DICOM file from the memory in response to the accessing the DICOMDIR file stored in the memory.

8. A method of testing a test subject for compliance with a digital imaging and communications in security (DICOS) standard, the method comprising:
   confirming, via a processor, that a transmitted DICOS message from the test subject is compliant with the DICOS standard;
   logging any errors in the transmitted DICOS message from the test subject in a validation report stored in a memory coupled to the processor; and
   transmitting, via the processor, a simulated DICOS message to the test subject.

9. The method according to claim 8, wherein the transmitted DICOS message is a request or a response from the test subject.

10. The method according to claim 8, wherein the simulated DICOS message is a request or response.

11. The method according to claim 1 further comprising, in response to the transmitted DICOS message, accessing a DICOMDIR file stored in the memory, the DICOMDIR file being configured as a directory for DICOM file sets stored the memory.

12. The method according to claim 11 wherein the transmitting a simulated DICOS message to the test subject is performed in response to accessing the DICOMDIR file stored in the memory.

13. The method according to claim 11 further comprising storing a DICOM file in the memory in response to the accessing the DICOMDIR file stored in the memory.

14. The method according to claim 11 further comprising retrieving a DICOM file from the memory in response to the accessing the DICOMDIR file stored in the memory.

* * * * *